(12) United States Patent
Kawai (10) Patent No.: US 6,717,716 B2
(45) Date of Patent: Apr. 6, 2004

(54) METHOD OF MANUFACTURING ELECTROPHORETIC DEVICE AND METHOD OF MANUFACTURING ELECTRONIC APPARATUS

(75) Inventor: Hideyuki Kawai, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/077,484

(22) Filed: Feb. 15, 2002

(65) Prior Publication Data

US 2003/0103258 A1 Jun. 5, 2003

(30) Foreign Application Priority Data

Feb. 15, 2001 (JP) ........................ 2001-038936
Feb. 15, 2002 (JP) ........................ 2002-037899

(51) Int. Cl.$^7$ .................... G02B 26/00; G09G 3/34; B29C 39/10
(52) U.S. Cl. .................... 359/296; 359/295; 359/452; 345/107; 264/4; 264/5
(58) Field of Search .................... 359/296, 452, 359/253, 2, 66, 295; 345/107; 264/4, 5, 15, 24

(56) References Cited

U.S. PATENT DOCUMENTS 6,392,786 B1 * 5/2002 Albert ........................ 359/296
6,531,997 B1 * 3/2003 Gates et al. ................ 345/107
2001/0055000 A1 * 12/2001 Kanae et al. ............... 345/107

* cited by examiner

Primary Examiner—Georgia Epps
Assistant Examiner—M. Hasan
(74) Attorney, Agent, or Firm—Harness, Dickey & Pierce, P.L.C.

(57) ABSTRACT

In applying an application material 7 containing microcapsules 7 dispersed therein on a transparent film 1 on which an ITO electrode 2 is formed, the application is performed under a condition in which a voltage with polarity opposite to the electrophoretic particles in the microcapsules 7a is applied to the ITO electrode 2. Since the electrophoretic particles in the microcapsules 7a and the ITO electrode 2 are attracted to each other, the microcapsules 7a are attracted to the ITO electrode 2. Therefore, the microcapsules 7a in an upper layer of overlapping layers easily enter the spaces between the microcapsules 7a in a lower layer. It is thus possible to avoid overlapping of the microcapsules 7a, and obtain an electrophoretic layer 3 having the microcapsules uniformly arranged therein.

9 Claims, 7 Drawing Sheets

METHOD OF MANUFACTURING ELECTROPHORETIC DEVICE AND METHOD OF MANUFACTURING ELECTRONIC APPARATUS

TECHNICAL FIELDS

The present invention relates to a method of manufacturing an electrophoretic device, and a method of manufacturing an electronic apparatus, and more specifically, the present invention relates to a method of manufacturing an electrophoretic device facilitating the manufacturing thereof, and a method of manufacturing an electronic apparatus.

RELATED ART

Figure 4:
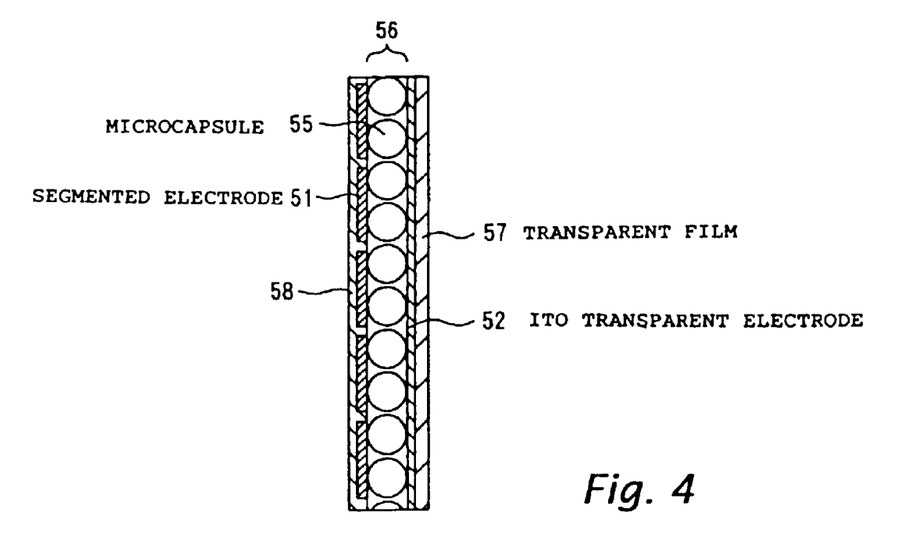
FIG. 4 is a schematic drawing schematically showing the construction of an electrophoretic device.

A known electrophoretic device is such an electrophoretic display device as shown in FIG. 4, for example. Namely, an electrophoretic microcapsule layer 56 formed by uniformly applying microcapsules 55 in each of which a colored dispersion medium, for example, colored black, and charged white pigment particles dispersed in the dispersion medium are enclosed, is formed between a pair of electrodes 51 and 52. In the case shown in FIG. 4, one of the electrodes is the ITO transparent electrode 52 comprising, for example, an ITO film uniformly formed on one plane of a transparent film 57, and the other electrode comprises a segmented electrode 51 formed by patterning an electrode in segments having an appropriate shape and size. The ITO transparent electrode 52 is at a ground level, and an appropriate dipolar voltage is applied to each of the segments of the segmented electrode 51 to display a desired image.

In this electrophoretic device, for example, the microcapsules 55 containing an electrophoretic dispersion medium are uniformly applied onto the ITO transparent electrode 52 bonded to the transparent film 57, and then the segmented electrode 51 formed on a film 58 is laminated so that the segmented electrode 51 faces the electrophoretic layer 56.

Figure 5:
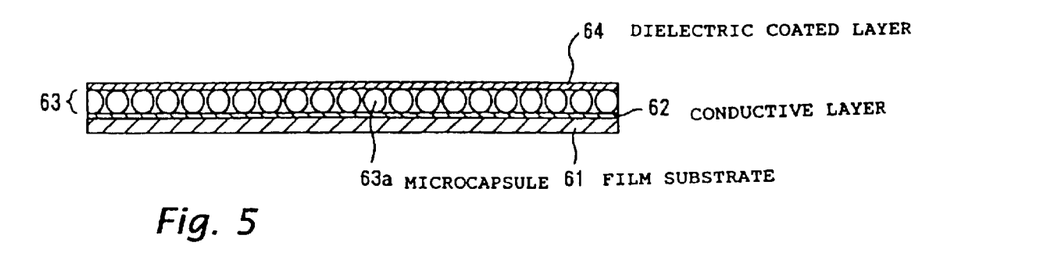
FIG. 5 is a schematic drawing schematically showing the construction of an electrophoretic device.

For example, an electrophoretic rewritable sheet having such a structure as shown in FIG. 5 is also known, in which a conductive layer 62 serving as one of the electrodes is formed on a film substrate 61, an application material with microcapsules 63a containing an electrophoretic dispersion medium dispersed therein is applied onto the conductive layer 62 to form an electrophoretic layer 63, and a dielectric coated layer 64 serving as the other electrode is formed on the electrophoretic layer 63. In such an electrophoretic rewritable sheet, by charging the surface of the dielectric coated layer 64, an electric field is applied to the electrophoretic dispersion medium in the microcapsules 63a through the dielectric coated layer 64, so that an image is repeatedly written and deleted.

In a display device having the above-described structure, in order to obtain a good image, the microcapsule layer containing the electrophoretic dispersion medium must comprise a uniform single layer.

However, the microcapsules containing the electrophoretic dispersion medium, which is generally used for electrophoretic display devices, have a large diameter, and cannot be easily uniformly applied in a single layer, and thus a method capable of easily uniformly applying the microcapsule layer is required.

Therefore, the present invention has been achieved in consideration of the above-described unsolved conventional problem, and a first object of the present invention is to provide a method of manufacturing an electrophoretic device capable of easily uniformly applying a microcapsule layer. A second object of the present invention is to provide a method of manufacturing an electronic apparatus comprising an electrophoretic device.

SUMMARY OF THE INVENTION

In order to achieve the objects, in a first aspect of the present invention, a method of manufacturing an electrophoretic device that comprises an electrophoretic layer arranged between a pair of electrodes and comprising microcapsules each containing a dispersion medium with electrophoretic particles dispersed therein, comprises the step of attaching the microcapsules to a member while exerting electrical attractive force or electrical repulsive force on the microcapsules to form the electrophoretic layer.

In a second aspect of the present invention, in the above-described method of manufacturing an electrophoretic device, a voltage with polarity opposite to the microcapsules is applied to the member.

In a third aspect of the present invention, in the above-described method of manufacturing an electrophoretic device, the member is one of the pair of electrodes.

In a fourth aspect of the present invention, in the above-described method of manufacturing an electrophoretic device, the member is vibrated in attaching the microcapsules to the member.

In a fifth aspect of the present invention, a method of manufacturing an electrophoretic device comprising an electrophoretic layer that comprises microcapsules each containing a dispersion medium with electrophoretic particles dispersed therein, comprises the step of attaching the microcapsules to a member while exerting electrical attractive force or electrical repulsive force on the microcapsules to form the electrophoretic layer.

In a sixth aspect of the present invention, in the method of manufacturing an electrophoretic device in the fifth aspect, a voltage with polarity opposite to the microcapsules is applied to the member.

In a seventh aspect of the present invention, in the method of manufacturing an electrophoretic device in the fifth or sixth aspect, the member is an electrode.

In an eighth aspect of the present invention, in the method of manufacturing an electrophoretic device in the fifth to seventh aspects, the member is vibrated in attaching the microcapsules to the member.

In the present invention, a method of manufacturing an electronic apparatus comprising an electrophoretic device comprises the step of forming wiring made of a conductive material on a substrate, and the step of manufacturing the electrophoretic device by the above-described method of manufacturing an electrophoretic device.

In the method of manufacturing an electrophoretic device in the first to fourth aspects of the present invention, in attaching the microcapsules, which constitute the electrophoretic layer, to the member to form the electrophoretic layer, electrical attractive force or electrical repulsive force is exerted on the microcapsules. The electrical attractive force or electrical repulsive force can be exerted on the microcapsules by applying, to a member near the microcapsules, for example, a member to which the microcapsules are attached, or the like, a voltage with polarity opposite to or the same as the microcapsules, i.e., a voltage with polarity opposite to or the same as the charge possessed by ones having a higher absolute value of total charge among the electrophoretic particles contained in the microcapsules and the wall films of the microcapsules. For example, when the electrophoretic particles in the microcapsules have positive charge, the wall films of the microcapsules have negative charge, and the electrophoretic particles have a higher absolute value of total charge, and when the electrophoretic layer is formed on, for example, one of the electrodes as the member, the microcapsules are attached to the member in a state a potential with polarity opposite to the charged electrophoretic particles contained in the microcapsules is applied to the electrode. The wall films of the microcapsules and the member, i.e., the electrode, repel each other, while the electrophoretic particles and the electrode attract each other, thereby causing the microcapsules to be attracted to the electrode.

For example, when the microcapsules overlap each other, therefore, the microcapsules in an upper layer are attracted to the electrode to enter the spaces between the respective microcapsules in a lower layer to permit the formation of a uniform single microcapsule layer.

Furthermore, in this case, by vibrating the member vertically or laterally and longitudinally, the microcapsules in the upper layer can easily be moved into the spaces between the microcapsules in the lower layer, and thus the microcapsules can be securely uniformly arranged.

In the method of manufacturing an electrophoretic device in the fifth to eight aspects of the present invention, the same effect as the method of manufacturing an electrophoretic device in the first to fourth aspects of the present invention can be obtained.

The method of manufacturing an electronic apparatus comprises the step of manufacturing an electrophoretic device by the method of manufacturing an electrophoretic device of the present invention, thereby permitting the manufacturing of an electronic apparatus comprising an electrophoretic device having a uniform single microcapsule layer formed therein.

BRIEF DESCRIPTION OF THE DRAWINGS

FIG. 12 shows the construction of an electrophoretic display device comprising electronic paper, FIG. 12($a$) being a sectional front view, and FIG. 12($b$) being a plan view.

DESCRIPTION OF THE EMBODIMENTS

An Embodiment of the present invention will be described below on the basis of the drawings.

In this embodiment, a process for manufacturing an electrophoretic device of the present invention is applied to the manufacturing of an electrophoretic display device. FIG. 1 is a partial sectional view showing the manufacturing process.

Figure 1A:
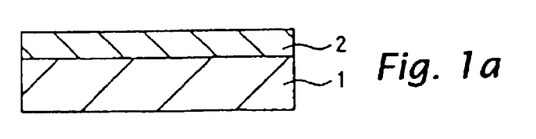
FIG. 1 is a drawing illustrating a process for manufacturing an electrophoretic display device.

First, as shown in FIG. 1($a$), an ITO (Indium Tin Oxide) film is formed on a transparent film 1 of plastic (synthetic resin) or the like by sputtering according to a known procedure. This film constitutes an ITO electrode 2 serving as one of electrodes.

Next, an electrophoretic layer 3 is formed on the ITO electrode 2. Namely, microcapsules 7$a$ each containing a dispersion medium comprising charged pigment particles (electrophoretic particles) dispersed in a dispersion medium are mixed in a transparent liquid (binder) to form an application material 7.

Figure 2:
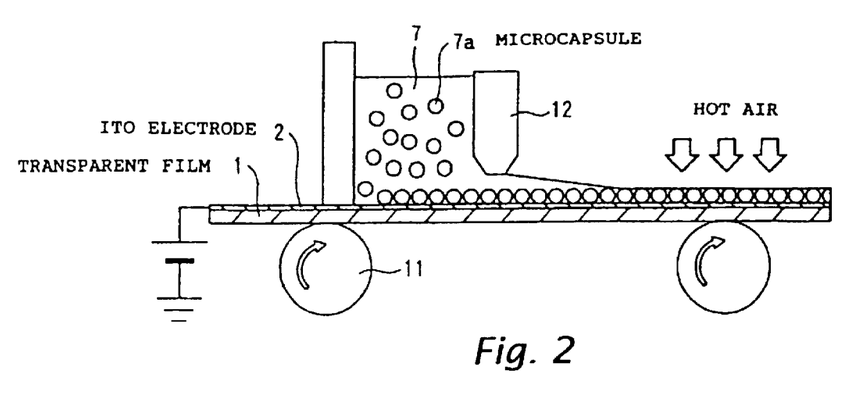
FIG. 2 is a drawing illustrating a method of manufacturing an electrophoretic device of the present invention.

Then, the application material 7 is applied to the ITO electrode (member) 2. For example, as shown in FIG. 2, the application material 7 is applied by using an application device using a known knife coating method. In this case, as shown in FIG. 2, the application is performed under a condition in which a voltage with polarity opposite to that of the whole polarity of the microcapsules 7$a$ is applied to the ITO electrode 2. Namely, a voltage with polarity opposite to the charge possessed by ones having a higher absolute value of total charge among the pigment particles and the wall films of the microcapsules 7$a$ is applied to the ITO electrode 2. For example, when the pigment particles have a larger amount of charge, a voltage with polarity opposite to the pigment particles is applied. Conversely, when the wall films of the microcapsules 7$a$ have a larger amount of charge, a voltage with polarity opposite to the wall films of the microcapsules 7$a$ is applied.

With the voltage applied to the ITO electrode 2, the application material 7 is supplied onto the ITO electrode 2 from above while the ITO electrode 2 is conveyed by driving feed rollers 11, and at the same time, the film thickness of the application material 7 is uniformly limited by a blade 12. After the film thickness of the application material 7 is uniformly limited, hot air is sprayed onto the ITO electrode 2 coated with the application material 7 to dry the coated film, to fix the microcapsules 7$a$.

In this process, a voltage is applied to the ITO electrode 2, and the polarity of the pigment particles in the microcapsules is different from the polarity of the ITO electrode 2, thereby causing attraction between the microcapsules and the ITO electrode 2. Therefore, by supplying the application material 7 onto the ITO electrode 2, the microcapsules 7$a$ dispersed in the application material 7 are attracted to the surface of the ITO electrode 2. For example, when the microcapsules 7$a$ overlap each other, the microcapsules 7$a$ in the upper layer are attracted to the ITO electrode 2 to easily enter the spaces between the microcapsules 7$a$ in the lower layer. Therefore, it is possible to avoid overlapping of the microcapsules 7$a$.

Therefore, the microcapsules 7$a$ can be uniformly applied on the ITO electrode 2 to form the electrophoretic layer 3 of high quality.

Figure 1B:
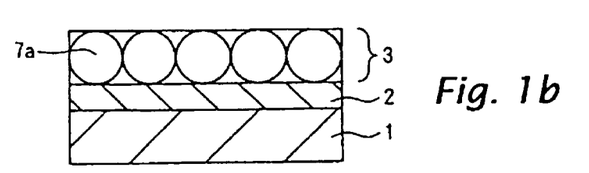
Figure 1C:
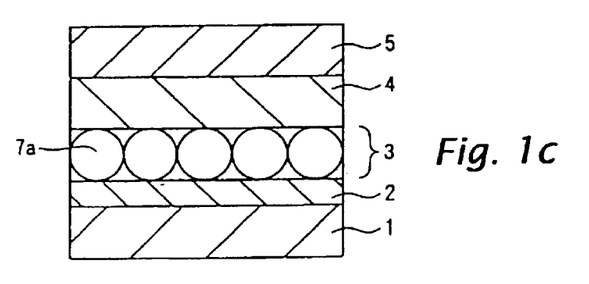

After the electrophoretic layer 3 is formed as shown in FIG. 1($b$), for example, a segmented electrode 4 divided into segments having a predetermined shape and size, is formed as another electrode on the electrophoretic layer 3 according to a known process, and a substrate 5 is further formed on the segmented electrode 4.

Consequently, an electrophoretic display device having a structure in which the electrophoretic layer 3 is formed between the two electrodes 2 and 4 can be obtained.

In this way, in applying the application material 7 containing the microcapsules 7a dispersed therein, a potential with polarity opposite to the charged pigment particles contained in the microcapsules 7a is applied to the ITO electrode 2 to cause the microcapsules 7a and the ITO electrode 2 to be attracted to each other by means of attractive force between the pigment particles and the ITO electrode 2. Therefore, the electrophoretic layer 3 can avoid being formed with the microcapsules 7a overlapping each other, and thus the electrophoretic layer 3 can be formed with the microcapsules 7a arranged in a uniform single layer.

Figure 3:
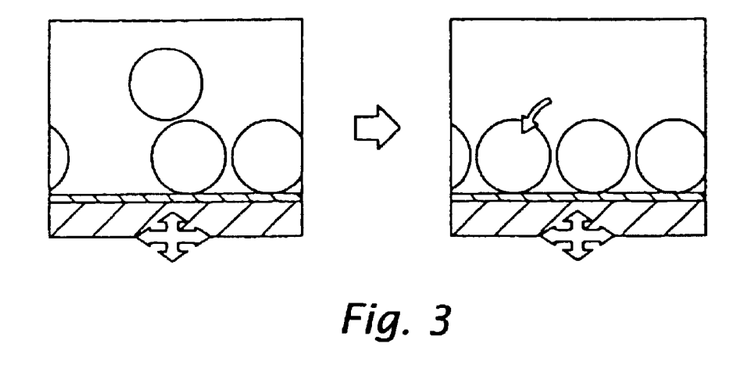
FIG. 3 is a drawing illustrating a method of manufacturing an electrophoretic device of the present invention.

In this embodiment, during application of the application material 7, the ITO electrode 2 may be vibrated vertically, longitudinally and laterally, as shown in FIG. 3. This may be realized by, for example, slightly decentering the feed rollers 11, or vibrating a piezoelectric element attached to the feed rollers 11. Alternatively, the ITO electrode 2 may be vibrated, or may be curved. This means enables the microcapsules 7a in the upper layer of the overlapping layers to easily enter the lower layer, thereby ensuring uniform arrangement of the microcapsules 7a, and the close arrangement of the microcapsules 7a.

Alternatively, in the vicinity of a portion where the microcapsules 7a contained in the application material 7 supplied onto the ITO electrode 2 are attached to the surface of the ITO electrode 2, the transfer path of the ITO electrode 2 may be formed in an angular shape, and thereafter returned to a planar shape. This can securely, uniformly and closely arrange the microcapsules 7a on the ITO electrode 2.

Although, in this embodiment, the formation of the electrophoretic layer 3 by the knife coating method is described, the formation is not limited to this, and of course, a roll coating method, a spin coating method or the like can also be used.

Although, in this embodiment, a description is made of the electrophoretic display device comprising the electrophoretic layer 3 formed between the ITO electrode 2 and the segmented electrode 4 so that an image or character is displayed by applying a voltage between the electrodes 2 and 4, an embodiment is not limited to this. The present invention can be applied to the electrophoretic rewritable sheet shown in FIG. 5, or the like in which the electrophoretic layer is formed between the conductive layer 62 and the dielectric coated layer 64, which constitute a pair of electrodes, and the surface of the dielectric coated layer 64 is charged to exert an electric field on a dispersion medium through the dielectric coated layer 64. Namely, the present invention can be applied to any case in which the electrophoretic layer 3 comprises a layer containing microcapsules.

Although, in this embodiment, the formation of the electrophoretic layer 3 between the ITO electrode 2 and the segmented electrode 4 is described, the formation is not limited to this, and of course, the present invention can be applied to the case in which another layer such as a dielectric layer or the like is provided between an electrode and an electrophoretic layer. By providing the dielectric layer between the electrode and the electrophoretic layer, as described above, memory durability of the electrophoretic layer can be improved.

Although, in this embodiment, a description is made of the case of applying the application material 7 to the ITO electrode 2 under a condition in which the voltage with polarity opposite to the pigment particles is applied to the ITO electrode 2, application is not limited to this, and for example, a dielectric material may be provided on the ITO electrode 2, and then charged by rubbing or the like. Alternatively, the application material 7 may be applied under a condition in which a dielectric material charged to the same polarity as the pigment particles is arranged above the surface of the member to which the application material 7 is applied, so that repulsive force between the pigment particles and the dielectric material is employed.

The present invention can be applied not only to the case in which the electrophoretic layer 3 is formed on the ITO electrode 2, but also to any case in which the electrophoretic layer 3 is formed on a desired substrate.

Although, in this embodiment, preparing the application material 7 containing the microcapsules 7a to be applied on the ITO electrode 2 is described, application is not limited to this, and for example, the present invention can be applied to the case in which the microcapsules 7a are arranged directly on the ITO electrode 2.

Although, in this embodiment, a description is made of the formation of the electrophoretic layer 3 between a pair of electrodes including the ITO electrode 2 and the segmented electrode 4, the formation is not limited to this, and the present invention is preferably applied to a construction in which electrodes for applying a voltage to the electrophoretic layer 3 are arranged so that the surfaces thereof are positioned perpendicularly to each other.

The present invention can also be applied to a construction comprising the ITO electrode 2 and the segmented electrode 4 which are disposed on the same substrate with an insulating layer provided therebetween so that the charged pigment particles contained in the microcapsules 7a move in parallel with the substrate surface.

Although, in this embodiment, the electrophoretic display device is described as an electronic apparatus comprising an electrophoretic device manufactured by the manufacturing method of the present invention, the electronic apparatus is not limited to this, and the present invention can also be applied to other electronic apparatuses.

A description will now be made of examples of application to electronic apparatuses such as a mobile personal computer, a cell phone, a digital still camera, an electronic book, electronic paper, an electronic notebook, and an electrophoretic display device comprising electronic paper with reference to FIGS. 6 to 12.

Figure 6:
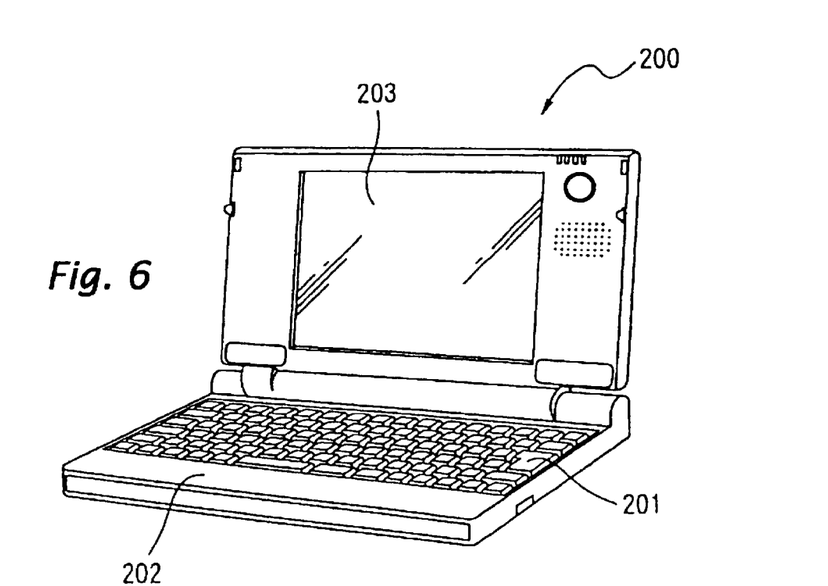
FIG. 6 is a perspective view showing the construction of a mobile personal computer.

FIG. 6 is a perspective view showing the construction of a personal computer.

A personal computer 200 comprises a main body 202 comprising a keyboard 201, and a display unit 203. In the personal computer 200, the display unit 203 comprises the electrophoretic device formed by the above-described manufacturing method.

Figures 7, 9:
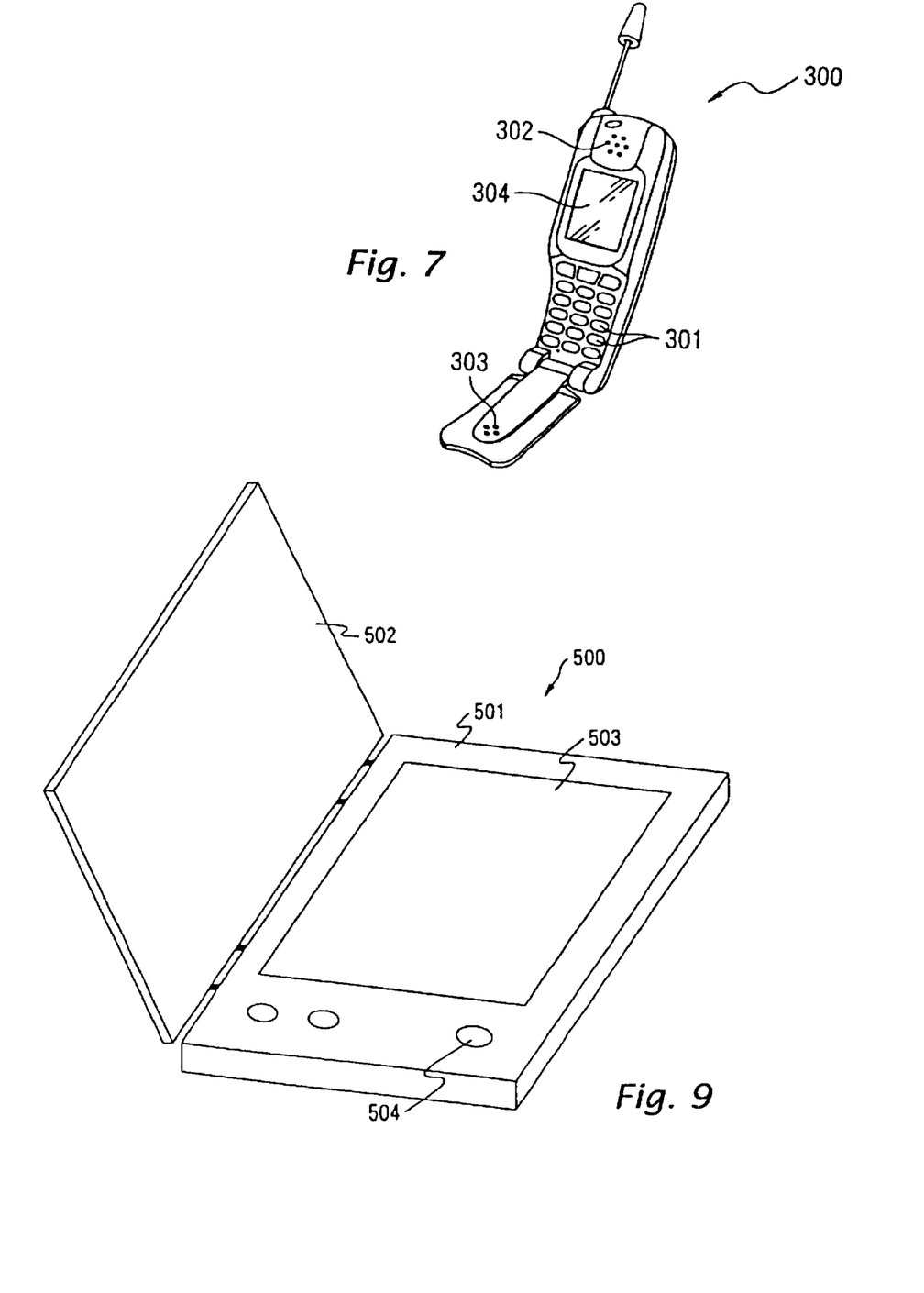
FIG. 7 is a perspective view showing the construction of a cell phone.
FIG. 9 is a perspective view showing the construction of an electronic book.

FIG. 7 is a perspective view showing the construction of a cell phone.

A cell phone 300 comprises a plurality of operating buttons 301, an earpiece 302, a mouthpiece 303, and a display panel 304. In the cell phone 300, the display panel 304 comprises the electrophoretic device formed by the above-described manufacturing method.

Figure 8:
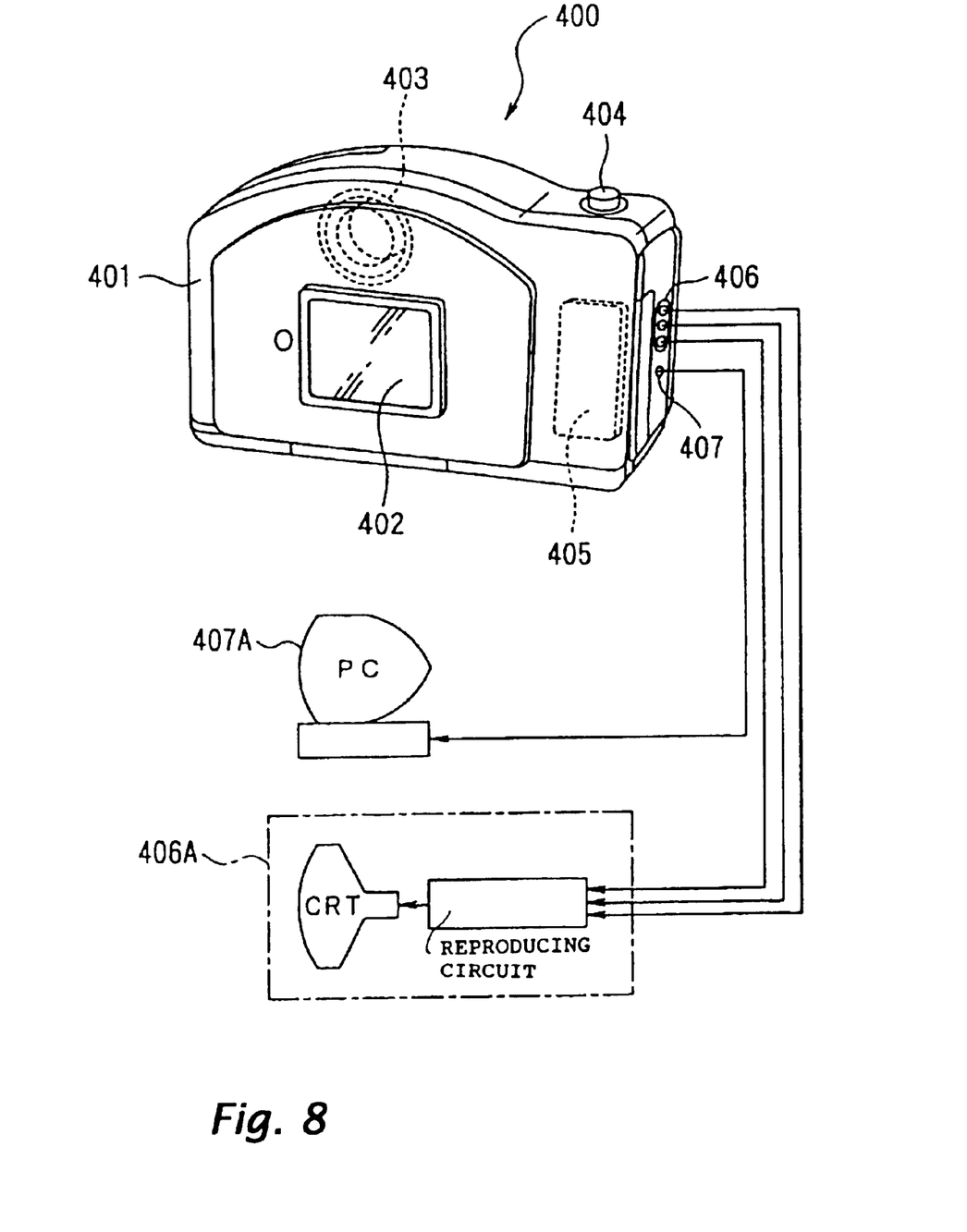
FIG. 8 is a perspective view showing the construction of a digital still camera.

FIG. 8 is a perspective view showing the construction of a digital still camera. This figure also briefly shows connection to external apparatuses.

A digital still camera 400 comprises a case 401, a display panel 402 formed at the back of the case 401 to perform display based on imaging signals from CCD (Charge Coupled Device), a light receiving unit 403 comprising an optical lens, the CCD, etc. formed on the observation side of the case 401 (the back of the drawing), a shutter button 404, and a circuit board 405 to which the imaging signals generated from the CCD at the time of pressing the shutter button 404 are transferred and stored. In the digital still camera 400, the display panel 402 comprises the electrophoretic device formed by the above-described manufacturing method.

Also, a video signal output terminal 406 and data communication input/output terminal 407 are provided on the side of the case 401 of the digital still camera 400, a television monitor 406A and a personal computer 470A being connected to the terminals 406 and 407, respectively, according to demand. In this construction, the imaging signals stored in a memory of the circuit board 405 are output to the television monitor 406A and the personal computer 407A by predetermined operations.

FIG. 9 is a perspective view showing the construction of an electronic book.

An electronic book 500 comprises a book-like frame 501, a cover 502 mounted on the frame 501 so that it can be opened and closed, a display device 503 provided on the surface of the frame 501 so that the display surface is exposed, and an operation unit 504. In the electronic book 500, the display device 503 comprises the electrophoretic device formed by the above-described manufacturing method.

Figure 10:
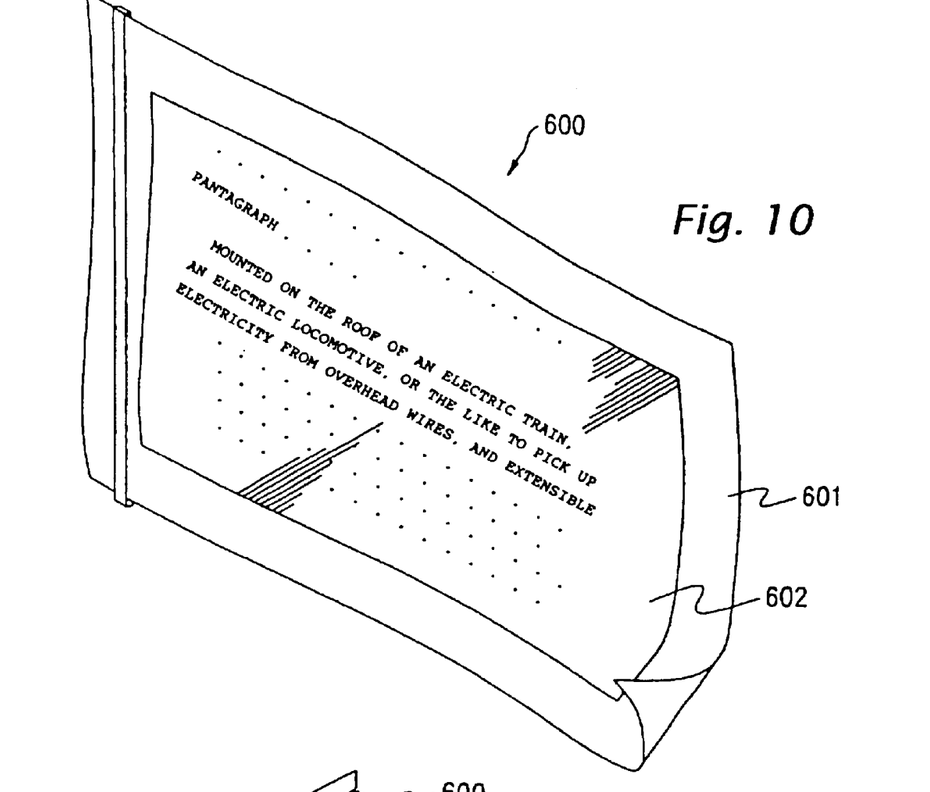
FIG. 10 is a perspective view showing the construction of electronic paper.

FIG. 10 is a perspective view showing the construction of electronic paper.

Electronic paper 600 comprises a main body 601 comprising a rewritable sheet having a texture like paper and flexibility, and a display unit 602. In the electronic paper 600, the display unit 602 comprises the electrophoretic device formed by the above-described manufacturing method.

Figure 11:
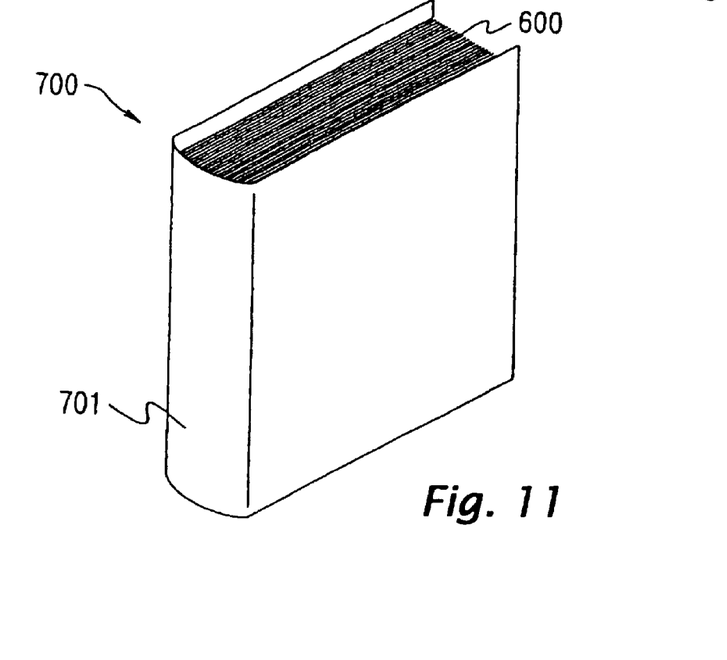
FIG. 11 is a perspective view showing the construction of an electronic notebook.

FIG. 11 is a perspective view showing the construction of an electronic notebook to which the electronic paper shown in FIG. 10 is applied.

An electronic notebook 700 comprises a cover 701, and a plurality of sheets of electronic paper 600 which are bundled together with the cover 701, and with display data input means provided on the cover 701, display contents can be changed with the sheets of electronic paper 600 bundled. In the electronic notebook 700, the electronic paper 600 comprises the electrophoretic device formed by the above-described manufacturing method.

Figure 12A:
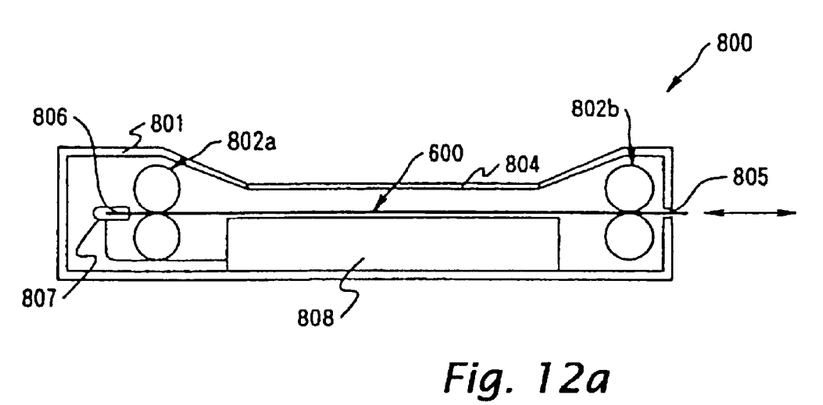
Figure 12B:
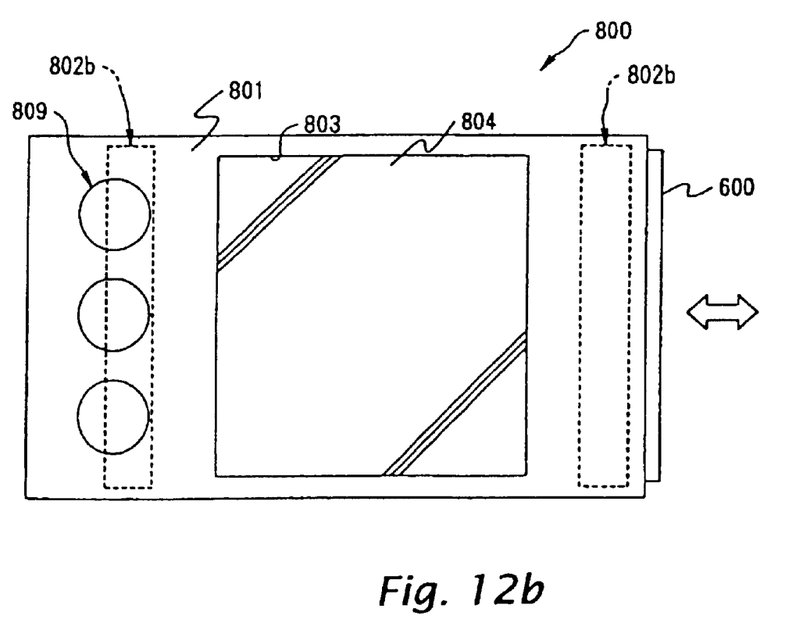

FIG. 12 shows an electrophoretic display device 800 having another construction comprising the electronic paper shown in FIG. 10, FIG. 12(*a*) being a sectional view, and FIG. 12(*b*) being a plan view.

The electrophoretic display device 800 comprises a main body 801 comprising two pairs of feed rollers 802*a* and 802*b*, the electronic paper 600 disposed on the main body 801 so as to be held between the feed rollers 802*a* and 802*b*, a transparent glass plate 804 fit into a rectangular hole 803 formed on the display surface side (the upper side of FIG. 10(*a*)) of the main body 801, an insertion hole 805 which is provided at an end of the main body 801 and into which the electronic paper 600 is inserted so as to be detachable from the main body 801, a controller 808 connectable, through a socket 807, to a terminal portion 806 provided at the tip in the insertion direction of the electronic paper 600, and an operation unit 809. In the display 800, the electronic paper 600 comprises the electrophoretic device formed by the above-described manufacturing method.

In the electrophoretic display device 800, the display surface is formed in such a manner that the electronic paper 600 disposed on the main body 801 is seen through the transparent glass plate 804. Also, the electronic paper 600 is detachably provided on the main body 801 so that it can be removed from the main body 801 for portable use.

The electronic apparatus is not limited to these, and examples of the electronic apparatuses include a television, a view finder-type or monitor direct-viewing video tape recorder, a car navigation device, a pager, an electronic notebook, an electric calculator, a word processor, a work station, a picture phone, a POS terminal, apparatuses comprising a touch panel, and the like. As the display unit of each of these electronic apparatuses, the electrophoretic device formed by the above-described manufacturing method can be applied.

Advantages

As described above, in the method of manufacturing an electrophoretic device in the first to fourth aspects of the present invention, in attaching microcapsules to a member, electrical attractive force or electrical repulsive force is exerted on the microcapsules, and thus the microcapsules can be attracted to the member to prevent overlapping of the microcapsules, thereby forming a uniform electrophoretic layer.

Furthermore, the member is vibrated to securely prevent overlapping of the microcapsules.

The method of manufacturing an electrophoretic device in the fifth to eighth aspects of the present invention can produce the same effect as the method of manufacturing an electrophoretic device in the first to fourth aspects of the present invention.

In the method of manufacturing an electronic apparatus of the present invention, an electrophoretic device is manufactured by the method of manufacturing an electrophoretic device of the present invention, and thus an electronic apparatus comprising an electrophoretic device having a uniform electrophoretic layer formed therein can be provided.

What is claimed is:

1. A method of manufacturing an electrophoretic device that comprises an electrophoretic layer arranged between a pair of electrodes, and the electrophoretic layer including microcapsules each containing a dispersion medium with electrophoretic particles dispersed therein, the method comprising:

the step of attaching the microcapsules to a member including at least one of the electrodes while exerting electrical attractive force or electrical repulsive force on the microcapsules to form the electrophoretic layer.

2. The method of manufacturing an electrophoretic device according to claim 1, wherein a potential with polarity opposite to the microcapsules is applied to the member.

3. The method of manufacturing an electrophoretic device according to claim 1, wherein the member further comprises one of the pair of electrodes.

4. The method of manufacturing an electrophoretic device according to claim 1, wherein the member is vibrated while attaching the microcapsules to the member.

5. A method of manufacturing an electrophoretic device that comprises an electrophoretic layer and a member on which the electrophoretic layer is placed, the electrophoretic layer comprising microcapsules each containing a dispersion medium with electrophoretic particles dispersed therein, the method comprising:

the step of attaching the microcapsules to a member while exerting electrical attractive force or electrical repulsive force on the microcapsules to form the electrophoretic layer.

6. The method of manufacturing an electrophoretic device according to claim 5, wherein a potential with polarity opposite to the microcapsules is applied to the member.

7. The method of manufacturing an electrophoretic device according to claim 5, the member further comprising an electrode.

8. The method of manufacturing an electrophoretic device according to claims 5, wherein the member is vibrated while attaching the microcapsules to the member.

9. A method of manufacturing an electronic apparatus comprising an electrophoretic device, the method comprising:

the step of forming a wiring made of a conductive material on a substrate; and the step of manufacturing the electrophoretic device by the method of manufacturing an electrophoretic device according to claim 1.

* * * * *